United States Patent
Sakiyama et al.

(10) Patent No.: US 7,416,320 B2
(45) Date of Patent: Aug. 26, 2008

(54) LIGHTING APPARATUS OF VEHICLE DOOR

(75) Inventors: Koji Sakiyama, Chiba (JP); Hiroshi Iwata, Aichi-ken (JP); Shigeru Yabuya, Aichi-ken (JP); Takahiko Sato, Aichi-ken (JP)

(73) Assignees: Fujikura Ltd., Tokyo (JP); Toyota Gosei Co.,Ltd, Aichi (JP)

( * ) Notice: Subject to any disclaimer, the term of this patent is extended or adjusted under 35 U.S.C. 154(b) by 0 days.

(21) Appl. No.: 11/486,046

(22) Filed: Jul. 14, 2006

(65) Prior Publication Data
US 2007/0014122 A1     Jan. 18, 2007

(30) Foreign Application Priority Data
Jul. 15, 2005    (JP)    ............................. 2005-207450

(51) Int. Cl.
*F21S 4/00*    (2006.01)

(52) U.S. Cl. .................. 362/501; 362/511; 362/545; 362/549

(58) Field of Classification Search ............... 362/501, 362/511, 545, 549, 555, 559, 581, 235, 332, 362/334, 335
See application file for complete search history.

(56) References Cited

U.S. PATENT DOCUMENTS

| | | | | |
|---|---|---|---|---|
| 5,193,895 A | * | 3/1993 | Naruke et al. | 362/542 |
| 5,982,969 A | * | 11/1999 | Sugiyama et al. | 385/123 |
| 6,095,673 A | * | 8/2000 | Goto et al. | 362/582 |

FOREIGN PATENT DOCUMENTS

| | | |
|---|---|---|
| DE | 3942450 A1 * | 2/1991 |
| EP | 1195296 | 4/2002 |
| EP | 1304260 | 4/2003 |
| EP | 1506892 | 2/2005 |
| JP | 2001-239881 A | 9/2001 |
| JP | 2002-2280 A | 1/2002 |
| JP | 2003-291722 A | 10/2003 |

* cited by examiner

*Primary Examiner*—Sharon E Payne
(74) *Attorney, Agent, or Firm*—Sughrue Mion, PLLC

(57) ABSTRACT

An apparatus is provided that makes it possible to make following cars aware when a door is open and simultaneously illuminate a feet area, including, a lens that is attached at a door position that faces the feet area when a vehicle door is open, and a light guide member that is attached at a door position that faces following cars. One or more LEDs for the feet area are provided on the inner side of the lens, and one or more LEDs for the rear direction are provided that irradiate light on the light guide member.

13 Claims, 6 Drawing Sheets

F I G. 1 2
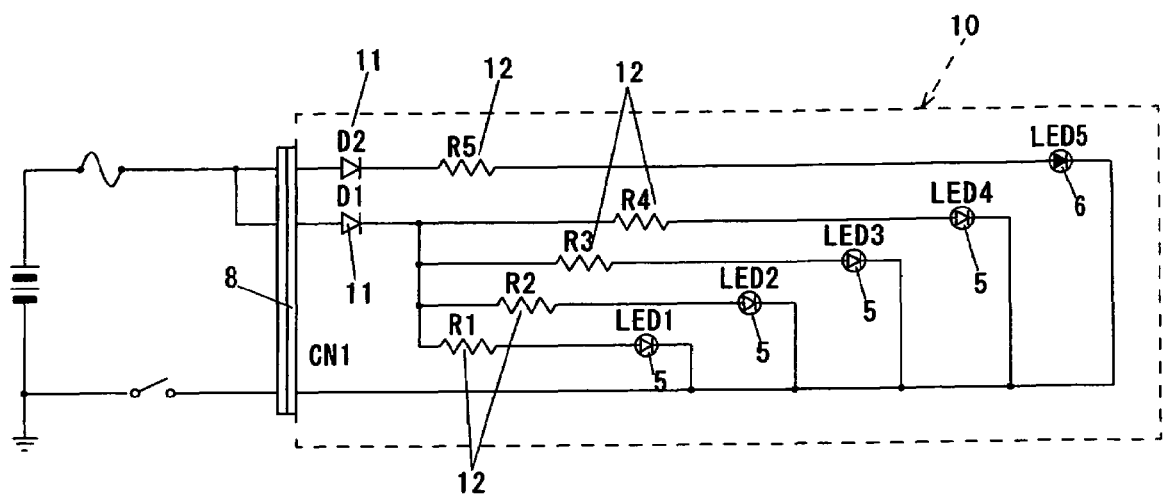

LIGHTING APPARATUS OF VEHICLE DOOR

CROSS-REFERENCE TO RELATED APPLICATIONS

This application is based upon Japanese Patent Application 2005-207450, filed on Jul. 15, 2005, in the Japanese Patent Office, the disclosure of which is incorporated herein in its entirety by reference.

BACKGROUND OF THE INVENTION

1. Field of the Invention

The present invention relates to a lighting apparatus of a vehicle door for illuminating the feet area of the door when a vehicle door is open and also for making following cars aware that the vehicle door is open.

2. Description of the Related Art

As a lighting apparatus that makes following cars aware that a vehicle door is open according to the prior art, an apparatus is known in which a light source (lamp, LED, etc.) is provided in biparting doors at a location in a rear door that faces the rear side of the vehicle when the rear door is open (Japanese Patent Laid-Open No. 2002-2280). Further, as a lighting apparatus that is provided to illuminate the feet area of a passenger getting in or out of a vehicle when the door is open to ensure safety when the passenger is getting in or out, i.e. a courtesy lamp, an apparatus is known that comprises a valve, a lens covering the valve, and a terminal that is attached to the inner surface side of the lens and holds the valve, wherein a terminal fixing part is formed at an edge on the inner surface side of the lens, and a leg of the terminal is fixed to the terminal fixing part (Japanese Patent Laid-Open No. 2003-291722). A device is also A known in which a lens is provided at a step part of a vehicle, and an LED light source is provided that covers this lens (Japanese Patent Laid-Open No. 2002-2280).

However, the apparatuses disclosed in Japanese Patent Laid-Open No. 2003-291722 and Japanese Patent Laid-Open No. 2001-239881 only function as courtesy lamps, and are simply devices that enhance the appearance from the external surface side of the lens and devices that attempt to improve the visibility of a step part. The apparatus disclosed in Japanese Patent Laid-Open No. 2002-2280 has only a function to make following cars aware that the door is open, and does not have an adequate function as a courtesy lamp. Furthermore, even if these apparatuses are combined, it would merely result in a device in which the courtesy lamp or LED is disclosed in Japanese Patent Laid-Open No. 2003-291722 or Japanese Patent Laid-Open No. 2002-2280 is attached to the front door in the apparatus disclosed in Japanese Patent Laid-Open No. 2002-2280.

SUMMARY OF THE INVENTION

An aspect of the present invention is to provide a lighting apparatus of a vehicle door that can make following cars aware when a door is open and simultaneously illuminate a feet area.

To attain the above aspect, a first exemplary, non-limiting embodiment of the present invention provides an apparatus in which a lens is mounted at a door position that faces a feet area when a vehicle door is open and a light guide member is mounted at a door position that faces following cars, wherein one or a plurality of LEDs for the feet area are provided on an inner side of the lens, and one or a plurality of LEDs for the rear direction are provided that irradiate light on the light guide member.

According to a second exemplary, non-limiting aspect of the present invention there is provided an apparatus having both a courtesy lamp function and a function as a warning lamp for following cars, in which a lens is provided at a door position that faces a feet area when a vehicle door is open and a light guide member is provided at a door position that faces following cars, wherein one or a plurality of LEDs for the feet area are provided on an inner side of the lens, and one or a plurality of LEDs for the rear direction are provided that irradiate light on the light guide member. Not only does this apparatus enhance safety by making it possible to confirm from the rear that a door is open and make it easier for passengers to get in or out by illuminating the feet area of passengers, but it also makes it possible to reduce the number of LEDs by using a light guide member. Further, by mounting the LEDs in a flexible printed circuit (FPC), the internal wiring of the LEDs can be easily integrated, a weight reduction can be achieved, and the number of parts can also be decreased to reduce costs.

BRIEF DESCRIPTION OF THE DRAWINGS

FIG. 12 is a circuit diagram of an LED according to an exemplary, non-limiting embodiment of the present invention.

DETAILED DESCRIPTION OF THE EXEMPLARY, NON-LIMITING EMBODIMENTS

Hereunder, exemplary, non-limiting embodiments of the present invention are described with reference to the drawings.

Figure 1:
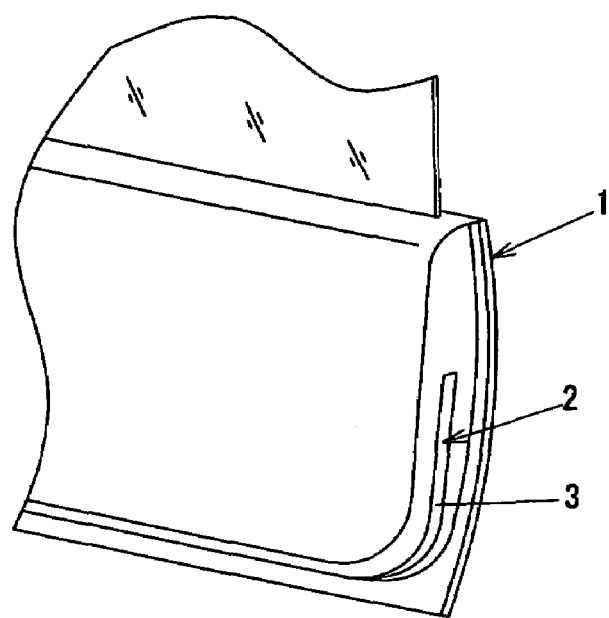
FIG. 1 is an oblique perspective view of a vehicle door.

FIG. 1 is an oblique perspective view of a vehicle door 1. FIG. 1 shows a state in which a lighting apparatus 2 according to an exemplary, non-limiting embodiment of the present invention is mounted in a door trim of the vehicle door 1. Only a light guide member 3 of the lighting apparatus 2 is illustrated in FIG. 1. Although FIG. 1 shows a vehicle door 1 that is commonly used for an ordinary passenger car, the lighting apparatus 2 can also be applied to a door having a hinge on the rear side, a sliding door, a back door or the like.

Figure 2:
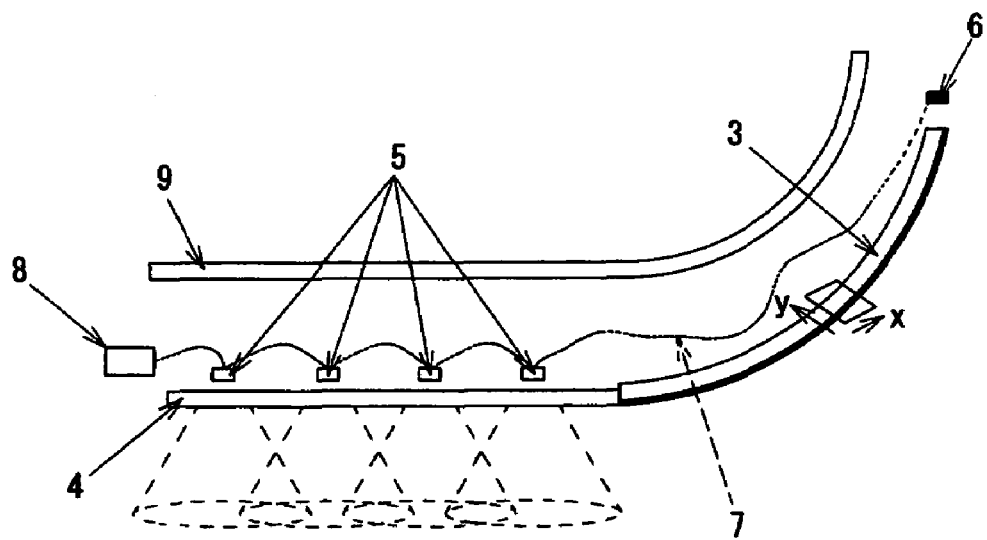
FIG. 2 is a schematic drawing of a lighting apparatus that is incorporated into a vehicle door according to an exemplary, non-limiting embodiment of the present invention.
Figure 3:
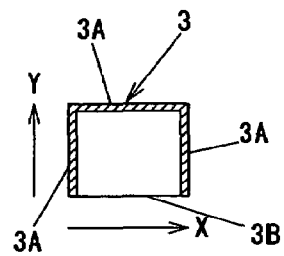
FIG. 3 is a cross section of a light guide member according to an exemplary, non-limiting embodiment of the present invention.

FIG. 2 shows an overall schematic diagram of the lighting apparatus 2 that is incorporated into the vehicle door 1 according to an exemplary, non-limiting embodiment of the present invention. On the undersurface side of the vehicle door 1, a lens 4 is provided so as to face toward a feet area when the vehicle door 1 is open. The light guide member 3 is formed in an arc-shaped curve and is attached from the undersurface to the side surface of the vehicle door 1 that is provided with the lens 4. A plurality of LEDs for the feet area 5 are provided on the inner side of the lens 4. An LED for the rear direction 6 that irradiates light on the light guide member 3 is provided on the inner side of the light guide member 3. Four white LEDs are used as the LEDs for the feet area 5, and one red LED is used as the LED for the rear direction 6. The LED for the rear direction 6 is provided at the top end of the inner side of the light guide member 3. The LEDs 5 and 6 are made electrically continuous by an internal wiring 7, and are connected to a connector (not shown) on the power supply side of the vehicle at the position of a connector 8. A case 9 is provided for housing the light guide member 3, the lens 4 and the LEDs 5 and 6 and the like. The components that are incorporated and integrated into the case 9 are mounted onto the vehicle door 1 (door trim or the like). The light guide member 3 is a square pole-shaped bar. As shown in FIG. 3, three sides thereof are covered by a reflecting member 3A, and light of the LED for the rear direction 6 is emitted from an emitting surface 3B. The arrows for the X and Y directions in FIG. 3 correspond to the X and Y arrows in FIG. 2.

Figure 4:
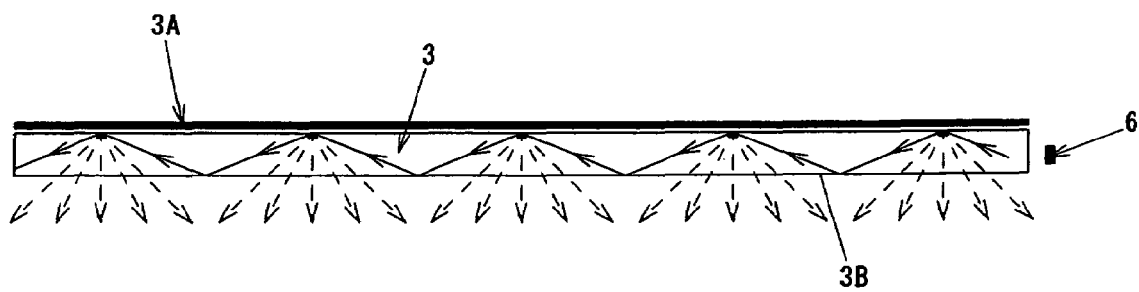
FIG. 4 is a view showing the relation between incident light from LEDs for the rear direction and outgoing light from a light guide member according to an exemplary, non-limiting embodiment of the present invention.

FIG. 4 shows the LED for the rear direction 6 and the light guide member 3, as well as the typical route of light incident on the light guide member 3 according to an exemplary, non-limiting embodiment of the present invention. As shown by the arrows, light incident on the light guide member 3 is guided to inside the light guide member 3 and is totally reflected at the emitting surface 3B but is scattered at a surface of the reflecting member 3A. This scattered light is emitted from the emitting surface 3B side. A member formed of acrylic resin is generally used as the light guide member 3. The reflecting member 3A is preferably formed by metal deposition with respect to this light guide member 3 that is formed with acrylic resin. Aluminum is generally suitable as the metal for deposition.

Figure 5:
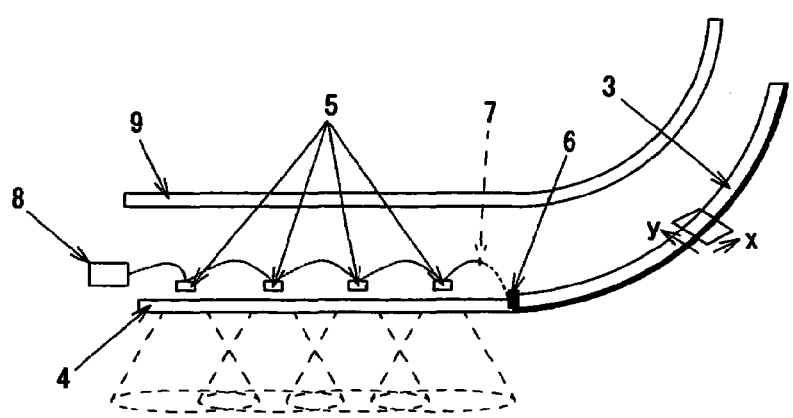
FIG. 5 is an overall schematic diagram that shows another exemplary, non-limiting embodiment of the present invention.

FIG. 5 is a view showing another exemplary, non-limiting embodiment in which the LED for the rear direction 6 is provided at the lower end side of the light guide member 3. The remaining configuration is the same as the preceding exemplary, non-limiting embodiment.

Figure 6:
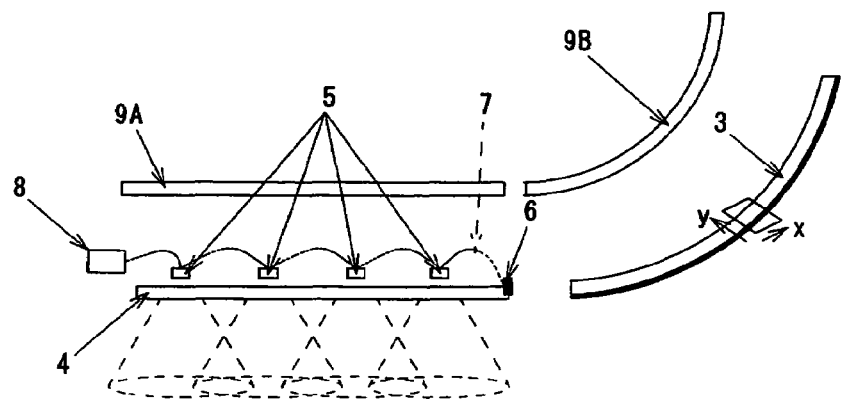
FIG. 6 is an overall schematic diagram that shows a further exemplary, non-limiting embodiment of the present invention.

According to a further exemplary, non-limiting embodiment as shown in FIG. 6, the above described case 9 is formed by two separate cases 9A and 9B. FIG. 6 shows an example in which the LEDs for the feet area 5 are mounted on the case 9A side, and the LED for the rear direction 6 is mounted on the case 9B side. These two cases 9A and 9B connect when they are mounted in the vehicle door 1. By dividing the case 9 into two parts, storage space can be saved and conveyance is facilitated.

Figure 7:
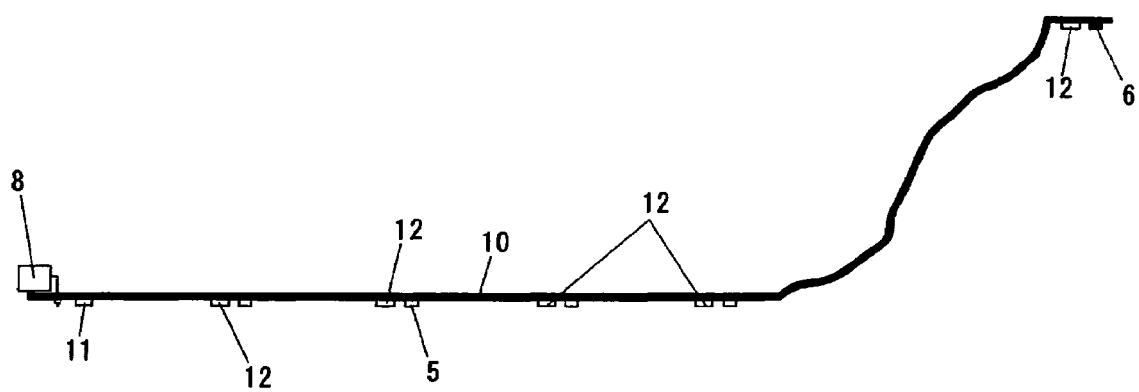
FIG. 7 is a view showing an exemplary, non-limiting embodiment of the present invention using an FPC.

FIG. 7 is a view showing an exemplary, non-limiting embodiment of the present invention in which the internal wiring 7 was implemented using a flexible printed circuit (FPC) 10. In FIG. 7, a reference numeral 11 denotes a diode and reference numerals 12 denote resistors.

Figure 8:
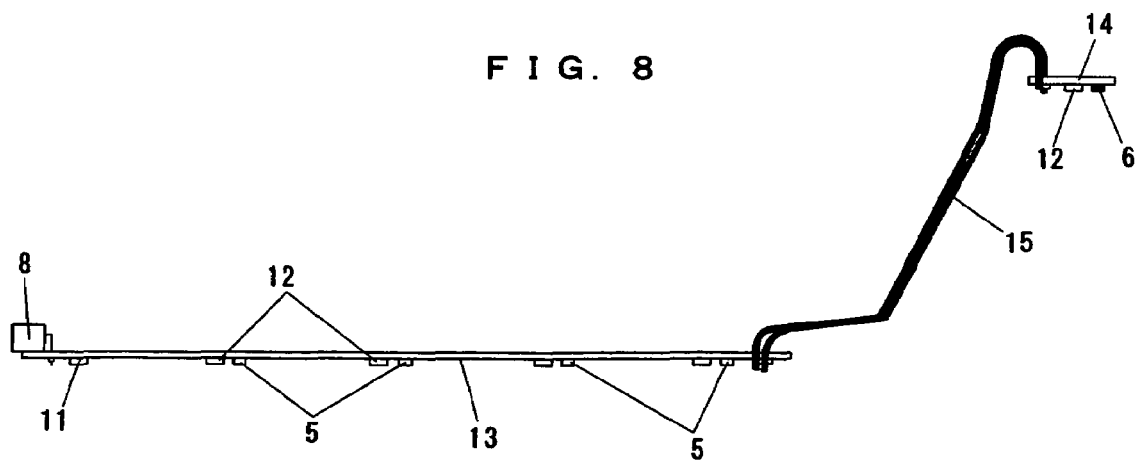
FIG. 8 is a view showing an exemplary, non-limiting embodiment of the present invention using a rigid printed board and an electric wire.

FIG. 8 is a view showing an exemplary, non-limiting embodiment of the present invention in which the internal wiring 7 was implemented using rigid printed boards 13 and 14. The LEDs for the feet area 5 and the LED for the rear direction 6 are mounted in separate rigid printed boards 13 and 14, respectively. The two rigid printed boards 13 and 14 are connected by an electric wire 15.

Figure 9:
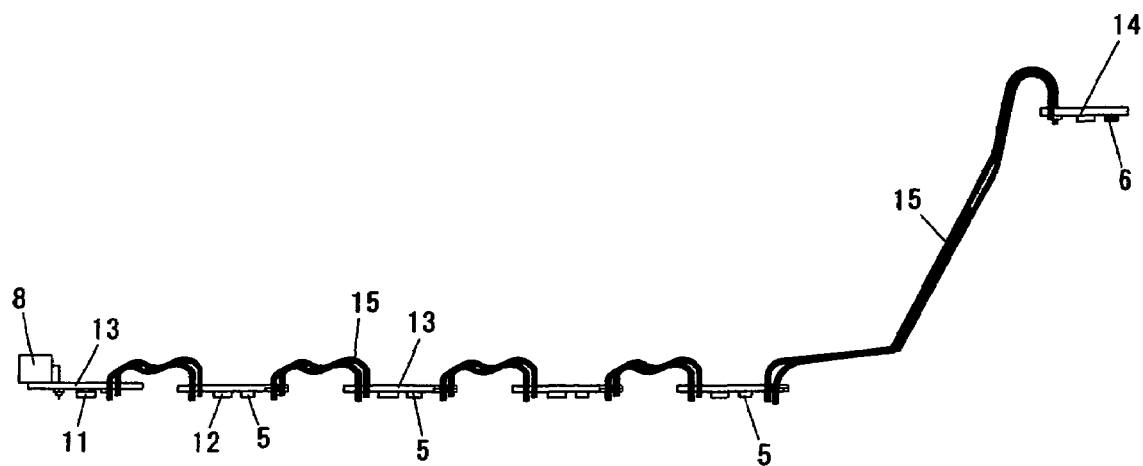
FIG. 9 is a view showing an exemplary, non-limiting embodiment that is similar to FIG. 8, but in which the rigid printed board is separated for each LED.

FIG. 9 is a view showing an exemplary, non-limiting embodiment of the present invention in which the rigid printed board 13 shown in FIG. 8 is formed in separate parts for each of the LEDs 5 (4 LEDs), and these separate parts are connected with electric wires 15.

An apparatus using the FPC 10 as shown in FIG. 7 has an overall weight of about 10 grams, and is thus extremely lightweight. The exemplary, non-limiting embodiment shown in FIG. 8 and FIG. 9 have weights of approximately 35 grams and 40 grams, respectively. The exemplary, non-limiting embodiment using the FPC 10 as shown in FIG. 7 has also the fewest component parts, and can thus contribute to cost reductions. It is extremely easy to alter the illumination direction of the LEDs 5 that are mounted in the FPC 10. For example, the LEDs 5 at both the left and right ends in FIG. 7 can be easily disposed at a certain angle to perform illumination such that the lights thereof converge on the center. More specifically, the orientation of the LEDs 5 can be freely set based on the way in which fitting members (not shown) of the FPC 10 provided in the case 9 are configured. By adopting a configuration in which the LEDs 5 at both ends illuminate towards the center in this manner, the level of brightness that illuminates the feet area can be increased.

Figure 10:
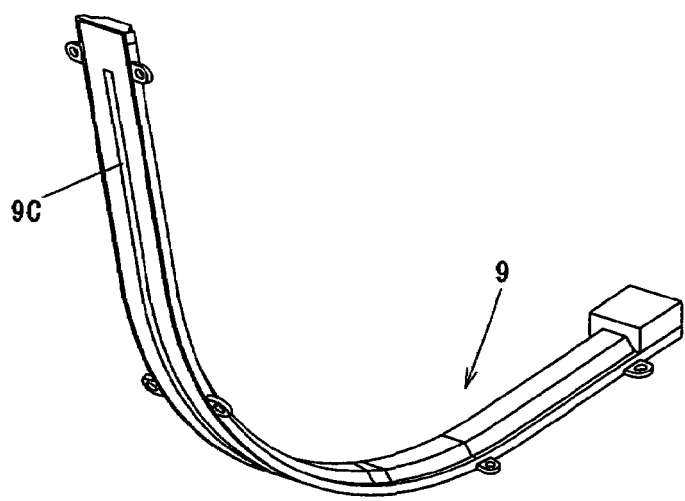
FIG. 10 is an overall perspective view of a case according to an exemplary, non-limiting embodiment of the present invention.
Figure 11:
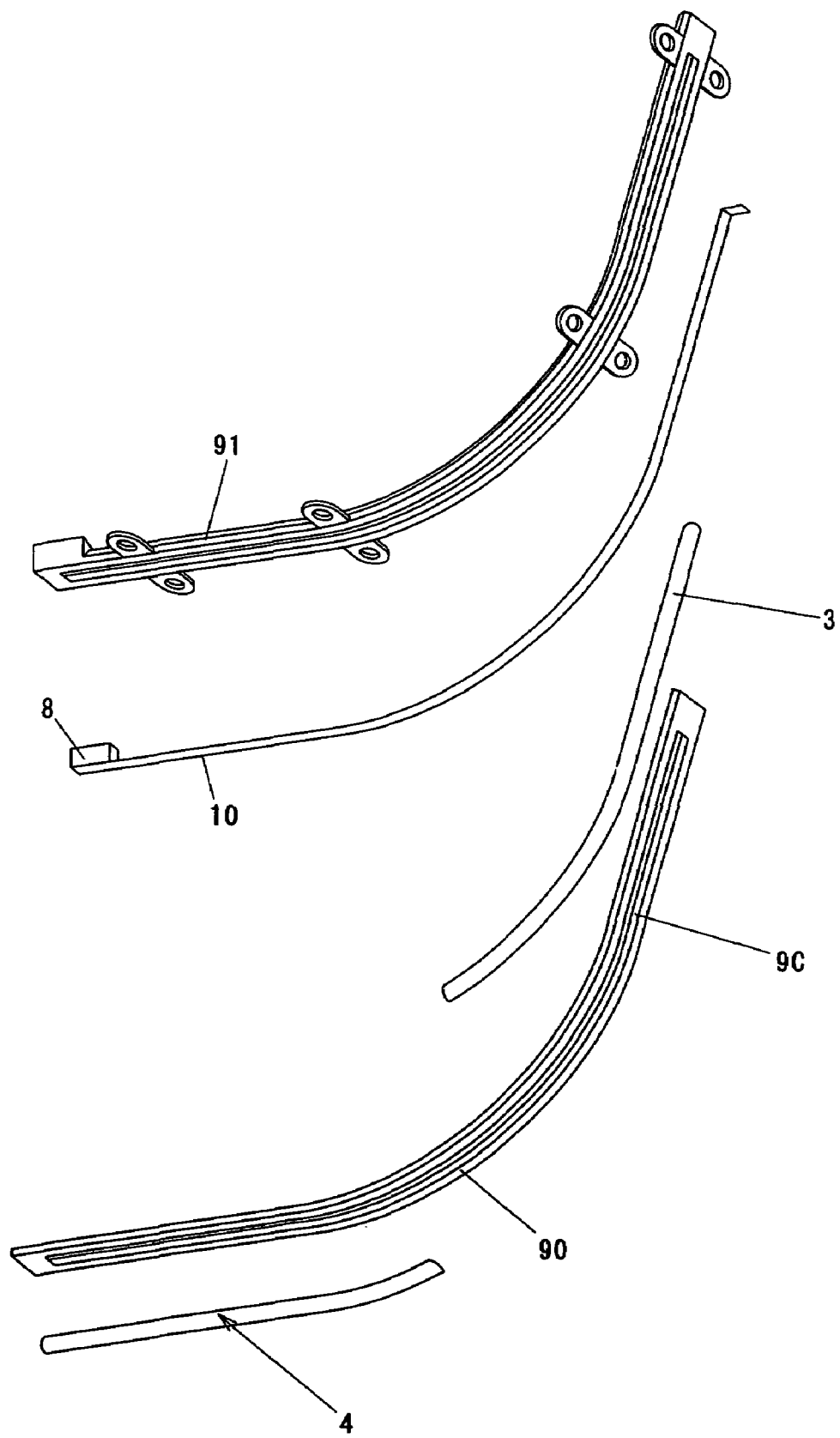
FIG. 11 is an exploded perspective view of the entire case and members to be integrated according to an exemplary, non-limiting embodiment of the present invention.

FIG. 10 is an overall perspective view of the case 9 according to an exemplary, non-limiting embodiment of the present invention. The light guide member 3 can be mounted in a slit 9C of a curved portion. FIG. 11 shows an overall exploded perspective view of other members to be mounted in the case 9 shown in FIG. 10. The case 9 comprises a lower case 90 and an upper case 91. The aforementioned slit 9C is formed in the lower case 90. The light guide member 3 is attached to this slit 9C, and the lens 4 is attached to the undersurface side of the lower case 90. A part in which the LEDs 5 and 6 and the like are mounted in the FPC 10, as shown in FIG. 7, is attached to the upper case 91. The upper case 91 is then attached to the lower case 90 to house the FPC 10 and the like in the case 9 and achieve the state shown in FIG. 10. This case 9 is then attached from the side surface to the under surface of the vehicle door 1.

FIG. 12 is a view showing an exemplary, non-limiting embodiment of the circuit design of LEDs 5 and 6.

While the invention has been particularly shown and described with reference to the exemplary non-limiting embodiments thereof, the present invention is not limited to the embodiments. Note that without departing from the scope of the invention, it is possible for a person having ordinary skill in the art to make additions, deletions, replacements and other alterations. The scope of the invention is not limited by the detailed description of the specific embodiments, but is only defined by the claims appended hereto, and their equivalents.

What is claimed is:

1. A lighting apparatus of a vehicle door comprising:
a lens which is mounted on the undersurface side of the vehicle door so as to face toward a feet area when the vehicle door is open,
a light guide member which is formed in an arc-shaped curve and attached from an undersurface to a side surface of the vehicle door that is provided with the lens, a plurality of first light emitting diodes (LEDs) for the feet area which is provided on the inner side of the lens, and one or more second LEDs for the rear direction which is provided on the inner side of the light guide member, wherein the light guide member, the lens and the plurality of first LEDs and at least one second LEDs are housed in a casing, the casing is mounted onto the door trim of the vehicle door, the lens is attached to the undersurface side of the casing in which a slit is formed, the light guide member is attached to said slit which is formed from the undersurface to the side surface of the vehicle door, and an internal wiring of the plurality of first LEDs and at least one second LEDs is implemented using a flexible printed circuit (FPC).

2. The lighting apparatus of a vehicle door according to claim 1, wherein the light guide member is formed with acrylic resin.

3. The lighting apparatus of a vehicle door according to claim 1, wherein the second LEDs for the rear direction are a different color than the first LEDs for the feet area.

4. The lighting apparatus of a vehicle door according to claim 1, wherein a reflecting member is provided on a surface other than an emitting surface of the light guide member, and light is emitted from one end side of the light guide member to irradiate light in a rear direction of the vehicle.

5. The lighting apparatus of a vehicle door according to claim 1, wherein the plurality of first LEDs and the at least one second LEDs are integrated.

6. The lighting apparatus of a vehicle door according to claim 1, wherein at least one LED among the plurality of first LEDs is disposed at an illumination angle that is different to an illumination angle of another of the plurality of first LEDs.

7. The lighting apparatus of a vehicle door according to claim 1, wherein the one or more second LEDs are disposed on an inner side of the light guide member.

8. The light apparatus of a vehicle door according to claim 1, wherein the one or more second LEDs are disposed on a lower end side of the light guide member.

9. A lighting apparatus of a vehicle door comprising:

a lens which is mounted on the undersurface side of the vehicle door so as to face toward a feet area when the vehicle door is open, a light guide member which is formed in an arc-shaped curve and attached from an undersurface to a side surface of the vehicle door that is provided with the lens, a plurality of first light emitting diodes (LEDs) for the feet area which is provided on the inner side of the lens, and at least one second LED for the rear direction which is provided on the inner side of the light guide member, wherein the light guide member, the lens and the plurality of first LEDs and at least one second LEDs are housed in a casing, the casing is mounted onto the door trim of the vehicle door, the lens is attached to an undersurface side of the casing in which a slit is formed, the light guide member is attached to said slit, which is formed from the undersurface to the side surface of the vehicle door, each internal wiring of the plurality of first LEDs and at least one second LEDs is implemented using separate rigid printed boards, and the two rigid printed boards are connected by an electric wire.

10. The lighting apparatus of a vehicle door according to claim 9, wherein a reflecting member is provided on a surface other than an emitting surface of the light guide member, and light is emitted from one side of the light guide member to irradiate light in a rear direction of the vehicle.

11. The lighting apparatus of a vehicle door according to claim 9, wherein at least one LED among the plurality of first LEDs is disposed at an illumination angle that is different to an illumination angle of another of the plurality of first LEDs.

12. The lighting apparatus of a vehicle door according to claim 9, wherein the one or more second LEDs are disposed on an inner side of the light guide member.

13. The lighting apparatus of a vehicle door according to claim 9, wherein the one or more second LEDs are disposed on a lower end side of the light guide member.

* * * * *